US009055251B2

(12) United States Patent
Palanivel et al.

(10) Patent No.: US 9,055,251 B2
(45) Date of Patent: Jun. 9, 2015

(54) IMAGE PROCESSING BASED ON AUTOMATIC IMAGE-TYPE DETECTION

(71) Applicant: XEROX CORPORATION, Norwalk, CT (US)

(72) Inventors: Dhevendra Alagan Palanivel, Webster, NY (US); Sainarayanan Gopalakrishnan, Chennai (IN); Xing Li, Webster, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 9 days.

(21) Appl. No.: 14/034,690

(22) Filed: Sep. 24, 2013

(65) Prior Publication Data

US 2015/0085320 A1    Mar. 26, 2015

(51) Int. Cl.
G06K 9/38      (2006.01)
H04N 1/40      (2006.01)
G06F 3/12      (2006.01)

(52) U.S. Cl.
CPC .......... H04N 1/40062 (2013.01); G06F 3/1208 (2013.01); G06F 3/126 (2013.01)

(58) Field of Classification Search
CPC ........... G06T 9/005; G06T 9/007; G06T 9/00; G06T 5/004; G06K 9/00456; G06K 9/00463; G06K 9/00469
USPC ......... 382/232, 233, 244, 245, 246, 247, 248, 382/250, 251, 254, 270, 274
See application file for complete search history.

(56) References Cited

U.S. PATENT DOCUMENTS

| 5,765,029 | A | 6/1998 | Schweid et al. |
| 6,650,439 | B1 | 11/2003 | Nagarajan et al. |
| 6,985,628 | B2 | 1/2006 | Fan |
| 7,424,151 | B2 | 9/2008 | Lin et al. |
| 2001/0043752 | A1* | 11/2001 | Matsuura et al. ............. 382/248 |
| 2002/0163654 | A1* | 11/2002 | Levantovsky ................. 358/1.2 |
| 2003/0012445 | A1* | 1/2003 | Matsuura et al. ............. 382/248 |
| 2004/0001634 | A1* | 1/2004 | Mehrotra ...................... 382/232 |

FOREIGN PATENT DOCUMENTS

EP        0 096 219        12/1983

* cited by examiner

*Primary Examiner* — Ali Bayat
(74) *Attorney, Agent, or Firm* — Gibb & Riley, LLC

(57) ABSTRACT

Methods and systems divide an image into image blocks, determine a number of high-variation blocks within valid image blocks, determine a page variance measure by dividing the number of high-variation blocks by the total number of valid image blocks, and classify the image as comprising a halftone and/or text image if the page variance measure exceeds a halftone threshold. Such methods and systems classify the image as being a continuous tone image if the page variance measure does not exceed the halftone threshold and a text index is below a text index threshold, and classify the image as being a continuous tone and text image if the page variance measure does not exceed the halftone threshold and the text index is not below the text index threshold. Further, such methods and systems select an image processing mode based on such image classifications.

23 Claims, 4 Drawing Sheets

IMAGE PROCESSING BASED ON AUTOMATIC IMAGE-TYPE DETECTION

BACKGROUND

Systems and methods herein generally relate to image processing and more particularly to automated systems for detecting image types.

Copy and scan image processing is generally based on user inputs such as original type, that can be set (for example) to photo or text or mixed (photo and text). Often times there are also sub-types with one original type. For example, there could be "printed photo" and "glossy photo" within the original type photo. The user may not always know what to select, and may end up producing output with compromised image quality.

SUMMARY

Methods and systems herein receive an image into a computerized device and divide the image into image blocks, using the computerized device. The image is divided into image blocks by, for example, assigning rectangular geometric regions to the image.

The methods and systems determine a block average by finding the average pixel value for each of the image blocks, using the computerized device. The pixel value is a darkness measure for each pixel. Such methods and systems similarly find the squared error for each pixel within each of the image blocks (by calculating the squared difference between a pixel value and the block average for each pixel in each of the image blocks). The squared error for each pixel is found by multiplying the difference between a pixel value and the block average by itself. Such methods and systems also find the sum of squared errors value for each of the image blocks by summing, for each of the image blocks, the squared error for all pixels within each of the image blocks, using the computerized device.

Subsequently, these methods and systems examine whether each of the image blocks comprises a white background block (an invalid block) by determining if the block average for each image block is above a white background threshold (and the sum of squared errors value for the image block is below an error threshold) using the computerized device. The methods and systems herein remove the image blocks determined to be white background blocks, to leave only valid image blocks of the image, using the computerized device.

The methods and systems herein then calculate the number of high-variation blocks within the valid image blocks by counting the valid image blocks that have a sum of squared errors value exceeding a block variation threshold, using the computerized device. Next, such methods and systems herein determine a page variance measure by dividing the number of high-variation blocks by the total number of valid image blocks, using the computerized device.

Next, these methods and systems classify the image as being a halftone, text, or halftone and text image if the page variance measure exceeds a halftone threshold; and select a tile-based parallel error diffusion image processing mode if the image is such a halftone and/or text image.

If the image is not classified as a halftone and/or text image, these methods and systems determine a text index by counting the number of the valid image blocks that have a sum of squared errors value exceeding a text threshold (using the computerized device). Such methods and systems classify the image as being a continuous tone image if the page variance measure does not exceed the halftone threshold and the text index is below a text index threshold. Otherwise, these methods and systems classify the image as being a continuous tone and text image if the page variance measure does not exceed the halftone threshold and the text index is not below the text index threshold (again, using the computerized device). The methods and systems herein select a sequential error diffusion image processing mode for the image if the image is classified as a continuous tone and text image; and select a clustered dot halftone image processing mode if the image is classified as a continuous tone image.

The processes of determining the block average, the squared error, the sum of squared errors, and whether each of the image blocks comprises a white background block, can be performed in parallel processing that individually evaluates all of the image blocks simultaneously (at the same time) to increase processing efficiency. Also, in some examples, these methods and systems can filter all colors except gray from the image before dividing the image into image blocks, to increase efficiency.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
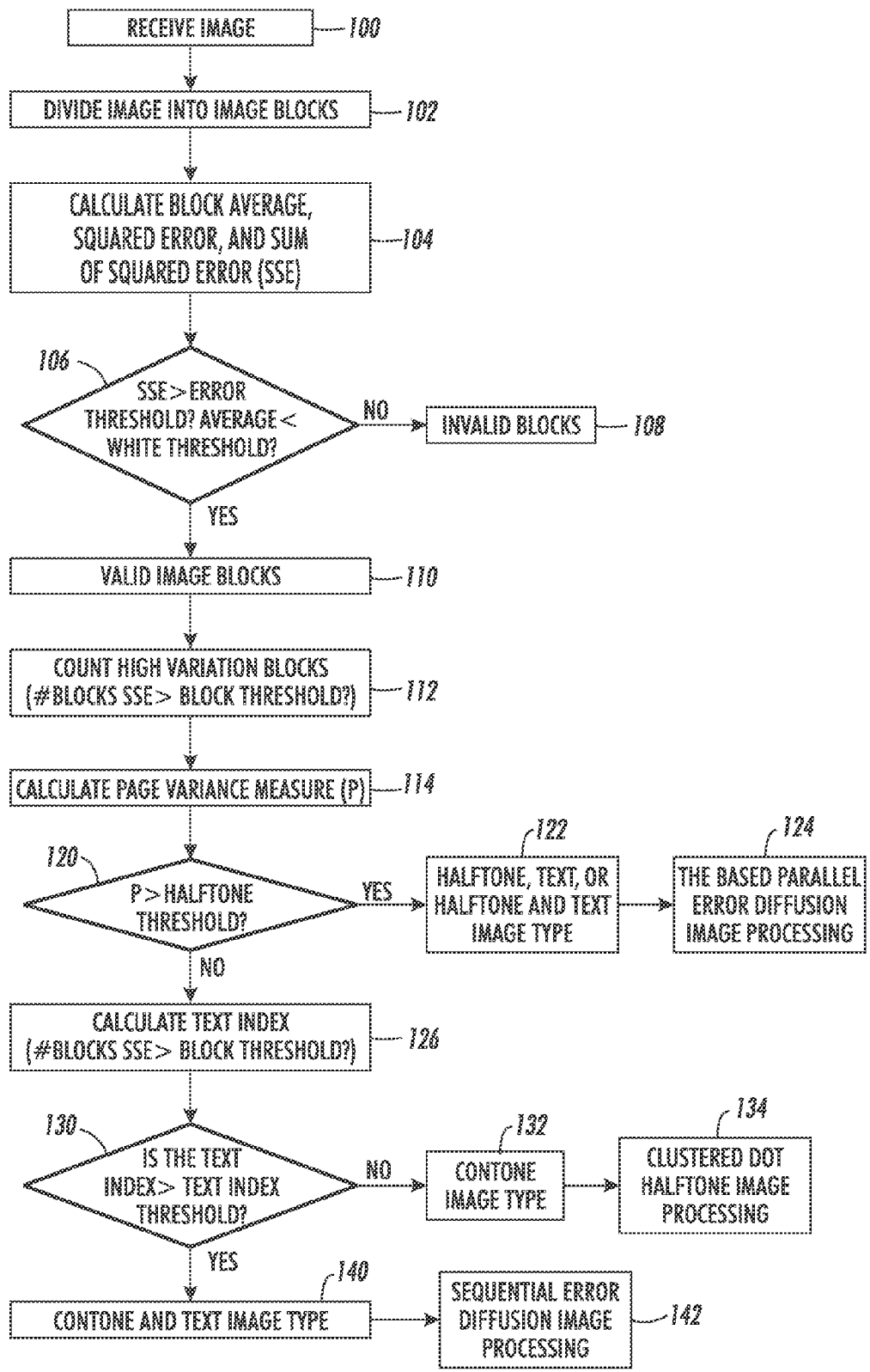
FIG. 1 is a flow diagram of various methods herein.

As mentioned above, a user may not always know what image-type to select for image processing, and may end up producing output with compromised image quality. In view of this, the systems and methods herein automatically detect the type of input image, and perform optimal processing accordingly, without user intervention. The systems and methods herein can use a software-based image path with more flexibility to include different processing options, and the knowledge of the original type can also be used by the systems and methods herein to deliver optimal performance.

Therefore, the systems and methods herein use automatic image-type detection to control image processing mode selection for image quality and system performance improvement. In one example, one of three rendering modes is selected based on the automated image-type detection results. The systems and methods herein are especially helpful in enabling the transition to lower cost, software-based image path solutions.

The systems and methods herein automatically detect the type of scanned input image and use a block-based approach in the detection process. The statistics of the features extracted from the blocks of the image are used to determine if the image is text, halftoned pictorials, continuous pictorials, or some mixture. These systems and methods enable automatic selection of processing modes, reducing the possibility of image quality compromises. Further, such systems and methods enable automatic selection of processing methods that provide optimized performance, which is especially useful in software-based image paths.

The following provides a brief overview of processing performed by the systems and methods herein. More specifically, the systems and methods herein divide the image into blocks. For example, the blocks can be 4*8 pixels each. For each block, these systems and methods calculate the block average, calculate the square of difference between pixel value and block average for each pixel in the block (squared error), and calculate the sum of squared errors (SSE) within block. If a block belongs to white background (determined using conditions SSE<Error_Threshold and Block Average>White_Threshold) it is classified as an invalid block.

Further, such systems and methods calculate the page variance measure as below:

$$\text{Page Variance Measure } 'P' = \frac{\text{Number of valid blocks with } SEE > \text{Block\_Threshold}}{\text{Total number of valid blocks}} * 100$$

The page is classified as halftone/text/halftone and text or contone/contone and text based on the value of "P." Specifically, if P>=P_Thresh, the page is classified as halftone/text/halftone and text. If P<P_Thresh, the page is classified as contone/contone and text. If an image is classified as contone/contone+text, then it is further validated for presence of text. This is done using SSE itself, and no separate measure used. Specifically, the calculation of the text index is shown below:

Text Index 'T'=Number of blocks with SSE>Text_Threshold

If T>T_Thresh, the page is classified as contone+text. The foregoing is explained in greater detail below.

The detection result can be used to determine various processing operations. It can be used independently/in the absence of a pixel-level segmentation tag, or it can be used alongside the segmentation tag. For example, a user-selected mode will determine the tone reproduction curve (TRC) for the whole job; however, with the systems and methods herein, the TRC will be automatically selected based on image-type detection results.

Segmentation tag based filtering can be applied, and the mode or original type the user specifies may affect filter selection. Mistakes in mode or image-type selection often result in image quality artifacts. With automatic image-type detection provided by systems and methods herein, these mistakes can be avoided. Without application of a segmentation tag, often a filter designed for handling different pixel types such as text and halftone is applied on the whole image. However, the automatic image-type detection of the systems and methods herein can use bigger, more sophisticated filters just on the types of images that need it, and use smaller filters for the rest of the image-types. This is especially useful for software-based image paths in which the filters are not fixed, and smaller filters provide real saving in computation time.

Another cause of image quality degradation is the application of the wrong rendering method, resulting from the wrong mode or image-type being selected by the user. However, the automatic image-type detection result provided by systems and methods herein can be used to determine the suitable rendering method, thus increasing the robustness of the image path. In a software-based image path, controlling the rendering based on automatic image-type detection also opens up opportunities for performance optimization.

One performance bottleneck in software-based image processing is error diffusion. The nature of the error diffusion operation hinders parallel processing otherwise made possible with multiple cores available in modern computing devices. However, the systems and methods herein satisfy both image quality and system performance requirements of real products, and provide rendering method selection based on image-type detection. The systems and methods described herein provide many modes of operation for rendering in the system.

One mode is tile-based parallel processing for error diffusion, with a certain amount of overlapping between the tiles. A second mode is regular halftone screening, and a third mode is regular sequential error diffusion. Tile-based processing is used for halftoned originals, or full text original, or originals with a mixture of halftones and text. This is based on the observation that due to the busy structure present in the original halftone and text, there are not many boundary artifacts noticeable with tile-based parallel error diffusion, when some amount of tile overlapping is used.

Continuous tone originals, on the other hand, are difficult to render with parallel error diffusion without showing boundary artifacts, but are actually more preferable for rendering with regular halftone processing. For images mixed with continuous tone content and other contents such as halftone and text, which is not common, regular sequential error diffusion is applied.

If the image does not contain continuous tone pictorial content, then systems and methods herein select tile-based parallel error diffusion as the rendering method. Or else, if the image does not contain text content, then systems and methods herein select clustered dot halftone as the rendering method. Otherwise, systems and methods herein select regular sequential error diffusion as the rendering method.

With the proposed method, the processing of most originals can take advantage of the performance enabled by a multi-core device, leaving only the rarely encountered original types for conventional sequential error diffusion.

FIG. 1 is flowchart illustrating exemplary methods herein. In item 100, these methods and systems receive an image into a computerized device and, in item 102, divide the image into image blocks, using the computerized device. The image is divided into image blocks, for example, by assigning rectangular geometric regions to the image, where all blocks are the same size to balance processing.

In item 104, the methods and systems determine a block average by finding the average pixel value for each of the image blocks, using the computerized device. The pixel value is a darkness measure for each the pixel, such as an "on" or "off" indicator for marking material such as inks or toners. Such methods and systems similarly find the squared error for each pixel within each of the image blocks (by calculating the squared difference between a pixel value and the block average for each pixel in each of the image blocks) in item 104. The squared error for each pixel is found by multiplying the difference between a pixel value and the block average by itself. Such methods and systems also find the sum of squared errors value for each of the image blocks in item 104 by summing, for each of the image blocks, the squared error for all pixels within each of the image blocks, using the computerized device. This processing can be performed in parallel processing that individually evaluates all of the image blocks simultaneously (at the same time) to increase processing efficiency Subsequently, these methods and systems examine whether each of the image blocks comprises a white background block (an invalid block) in item 106 by determining if the block average for each image block is above a white background threshold (and the sum of squared errors value for the image block is below an error threshold) using the computerized device. The methods and systems herein remove the image blocks determined to be white background blocks as invalid blocks 108, to leave only valid image blocks of the image 110, using the computerized device.

The methods and systems herein then calculate the number of high-variation blocks within the valid image blocks in item 112 by counting the valid image blocks that have a sum of squared errors value exceeding a block variation threshold, using the computerized device. Next, such methods and systems herein determine a page variance measure in item 114 by dividing the number of high-variation blocks by the total number of valid image blocks and multiplying the result by 100, using the computerized device.

Next, in item 120, these methods and systems classify the image as being a halftone, text, or halftone and text image 122 if the page variance measure exceeds a halftone threshold; and, in item 124 select a tile-based parallel error diffusion image processing mode if the image is such a halftone and/or text image.

If the image is not classified as a halftone and/or text image in item 120, these methods and systems determine a text index in item 126 by counting the number of the valid image blocks that have a sum of squared errors value exceeding a text threshold (using the computerized device).

In item 130, such methods and systems classify the image as being a continuous tone image 132 if the page variance measure does not exceed the halftone threshold and the text index is below a text index threshold. Otherwise, these methods and systems classify the image in item 130 as being a continuous tone and text image 140 if the page variance measure does not exceed the halftone threshold and the text index is not below the text index threshold (again, using the computerized device). The methods and systems herein select a clustered dot halftone image processing mode 134, if the image is classified as a continuous tone image 132; and select a sequential error diffusion image processing mode for the image 142 if the image is classified as a continuous tone and text image 140.

The determination of the block average, the squared error, the sum of squared errors (104), and whether each of the image blocks comprises a white background block (106), can be performed in parallel processing that individually evaluates all of the image blocks simultaneously (at the same time) to increase processing efficiency. Also, in item 102, these methods and systems can filter all colors except gray from the image before dividing the image into image blocks, to increase efficiency.

Figure 2:
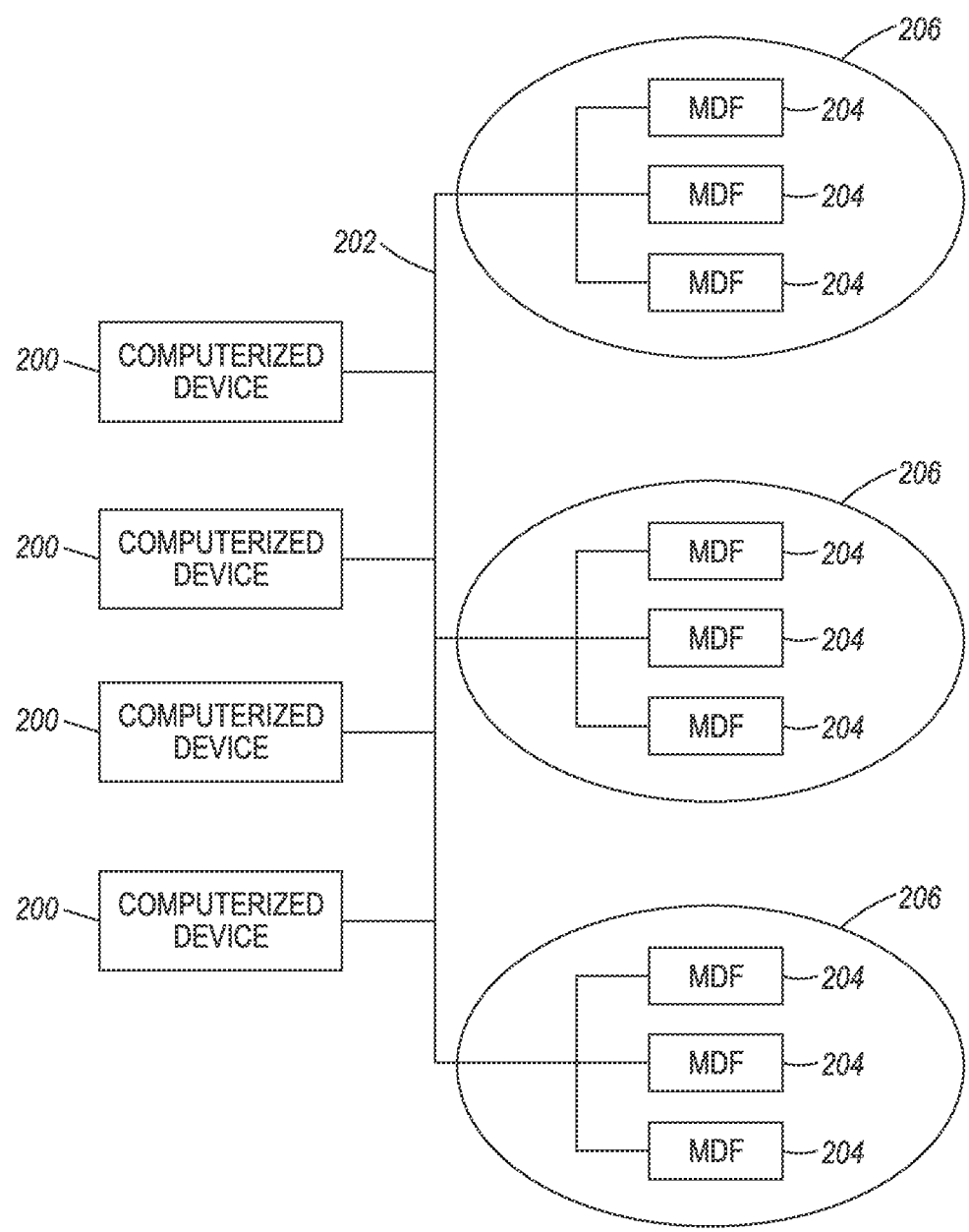
FIG. 2 is a schematic diagram illustrating systems herein.

As shown in FIG. 2, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
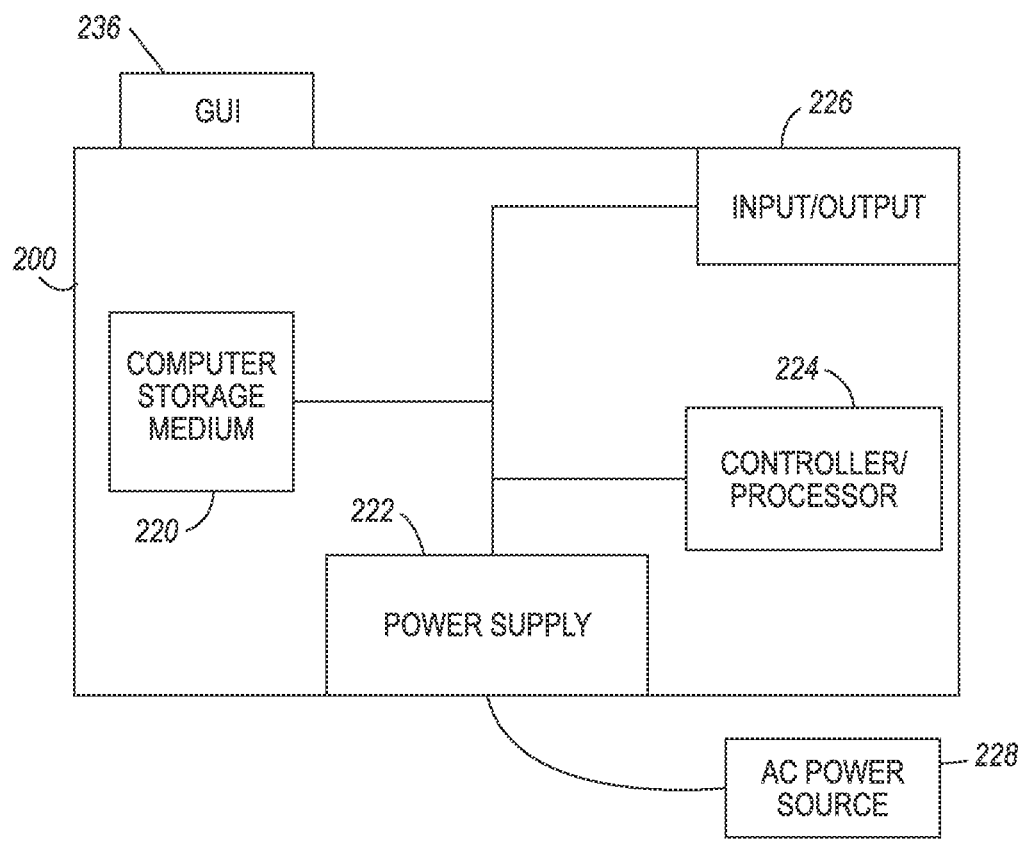
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operates on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from an alternating current (AC) source 228 by the power supply 222. The power supply 222 can comprise a power storage element (e.g., a battery, etc).

Figure 4:
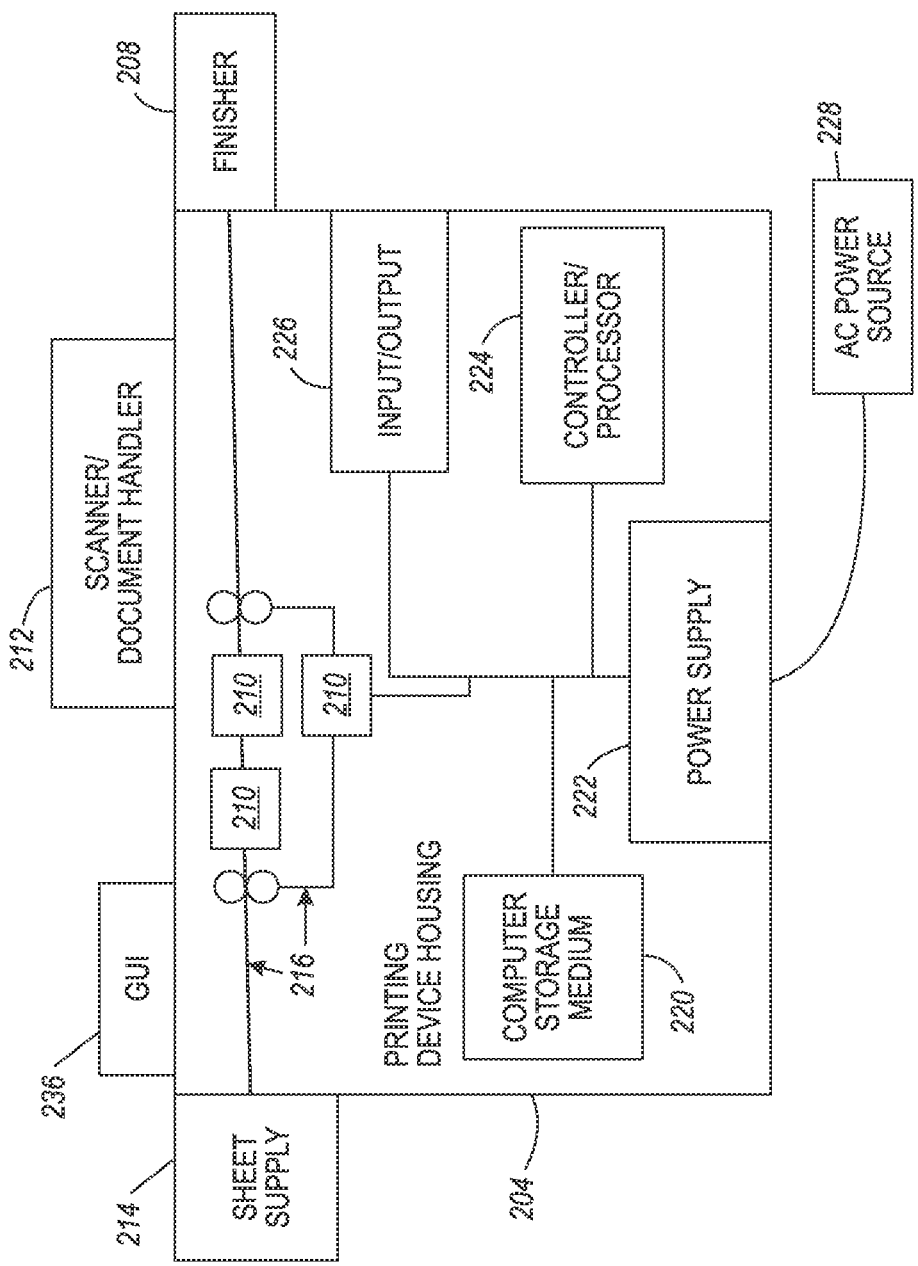
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area. In addition, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

The invention claimed is:

1. A method comprising:

receiving an image into a computerized device;

automatically determining an image-type of said image; and automatically selecting an image processing mode based on said image-type of said image, said automatically determining said image-type comprising:

automatically dividing said image into image blocks, using said computerized device;

automatically determining a block average by determining an average pixel value for each of said image blocks, using said computerized device;

automatically determining a squared error for each pixel within each of said image blocks by calculating a squared difference between a pixel value and said block average for each said pixel in each of said image blocks, using said computerized device;

automatically determining a sum of squared errors value for each of said image blocks, using said computerized device;

automatically removing ones of said image blocks determined to be a white background block to produce valid image blocks of said image, using said computerized device;

automatically determining a number of high-variation blocks within said valid image blocks by counting ones of said valid image blocks that have said sum of squared errors value exceeding a block variation threshold, using said computerized device;

automatically determining a page variance measure by dividing said number of high-variation blocks by a total number of said valid image blocks, using said computerized device;

automatically classifying said image as comprising a halftone and text image based on said page variance measure exceeding a halftone threshold, using said computerized device;

automatically determining a text index by counting a number of said valid image blocks that have said sum of squared errors value exceeding a text threshold, using said computerized device;

automatically classifying said image as comprising a continuous tone image based on said page variance measure not exceeding said halftone threshold and said text index being below a text index threshold, using said computerized device; and automatically classifying said image as comprising a continuous tone and text image based on said page variance measure not exceeding said halftone threshold and said text index not being below said text index threshold, using said computerized device, said automatically selecting said image processing mode comprising automatically selecting said image processing mode based on said image being one of said halftone and text image, said continuous tone and text image, and said continuous tone image.

2. The method according to claim 1, said determining said squared error for each pixel comprising multiplying said difference between a pixel value and said block average by itself.

3. The method according to claim 1, said dividing said image into image blocks comprising assigning rectangular geometric regions to said image.

4. The method according to claim 1, further comprising filtering all colors except gray from said image before performing said dividing said image into image blocks.

5. The method according to claim 1, said pixel value comprising a darkness measure for each said pixel.

6. The method according to claim 1, said pixel value comprising a darkness measure for each said pixel.

7. A method comprising:

receiving an image into a computerized device;

automatically dividing said image into image blocks, using said computerized device;

automatically determining a block average by determining an average pixel value for each of said image blocks, using said computerized device;

automatically determining a squared error for each pixel within each of said image blocks by calculating a squared difference between a pixel value and said block average for each said pixel in each of said image blocks, using said computerized device;

automatically determining a sum of squared errors value for each of said image blocks by summing, for each of said image blocks, said squared error for all pixels within each of said image blocks, using said computerized device;

automatically determining whether each of said image blocks comprises a white background block of said image by determining if said block average for each of said image blocks exceeds a white background threshold, using said computerized device;

automatically removing ones of said image blocks determined to be said white background block to produce valid image blocks of said image, using said computerized device;

automatically determining a number of high-variation blocks within said valid image blocks by counting ones of said valid image blocks that have said sum of squared errors value exceeding a block variation threshold, using said computerized device;

automatically determining a page variance measure by dividing said number of high-variation blocks by a total number of said valid image blocks, using said computerized device;

automatically classifying said image as comprising a halftone and text image based on said page variance measure exceeding a halftone threshold, using said computerized device;

automatically determining a text index by counting a number of said valid image blocks that have said sum of squared errors value exceeding a text threshold, using said computerized device;

automatically classifying said image as comprising a continuous tone image based on said page variance measure not exceeding said halftone threshold and said text index being below a text index threshold, using said computerized device;

automatically classifying said image as comprising a continuous tone and text image based on said page variance measure not exceeding said halftone threshold and said text index not being below said text index threshold, using said computerized device; and automatically selecting an image processing mode based on said image being one of said halftone and text image, said continuous tone and text image, and said continuous tone image.

8. The method according to claim 7, said determining said block average, said determining said squared error, said determining said sum of squared errors, and said determining whether each of said image blocks comprises a white background block, being performed in parallel processing that individually evaluates all of said image blocks simultaneously.

9. The method according to claim 7, said determining said squared error for each pixel comprising multiplying said difference between a pixel value and said block average by itself.

10. The method according to claim 7, said dividing said image into image blocks comprising assigning rectangular geometric regions to said image.

11. The method according to claim 7, further comprising filtering all colors except gray from said image before performing said dividing said image into image blocks.

12. The method according to claim 7, said pixel value comprising a darkness measure for each said pixel.

13. A method comprising:

receiving an image into a computerized device;

automatically dividing said image into image blocks, using said computerized device;

automatically determining a block average by determining an average pixel value for each of said image blocks, using said computerized device;

automatically determining a squared error for each pixel within each of said image blocks by calculating a squared difference between a pixel value and said block average for each said pixel in each of said image blocks, using said computerized device;

automatically determining a sum of squared errors value for each of said image blocks by summing, for each of said image blocks, said squared error for all pixels within each of said image blocks, using said computerized device;

automatically determining whether each of said image blocks comprises a white background block of said image by determining if said block average for each of said image blocks exceeds a white background threshold, using said computerized device;

automatically removing ones of said image blocks determined to be said white background block to produce valid image blocks of said image, using said computerized device;

automatically determining a number of high-variation blocks within said valid image blocks by counting ones of said valid image blocks that have said sum of squared errors value exceeding a block variation threshold, using said computerized device;

automatically determining a page variance measure by dividing said number of high-variation blocks by a total number of said valid image blocks, using said computerized device;

automatically classifying said image as comprising a halftone and text image based on said page variance measure exceeding a halftone threshold, using said computerized device;

automatically determining a text index by counting a number of said valid image blocks that have said sum of squared errors value exceeding a text threshold, using said computerized device;

automatically classifying said image as comprising a continuous tone image based on said page variance measure not exceeding said halftone threshold and said text index being below a text index threshold, using said computerized device;

automatically classifying said image as comprising a continuous tone and text image based on said page variance measure not exceeding said halftone threshold and said text index not being below said text index threshold, using said computerized device;

automatically selecting a tile-based parallel error diffusion image processing mode based on said image being said halftone and text image;

automatically selecting a sequential error diffusion image processing mode based on said image being said continuous tone and text image; and automatically selecting a clustered dot halftone image processing mode based on said image being said continuous tone image.

14. The method according to claim 13, said determining said block average, said determining said squared error, said determining said sum of squared errors, and said determining whether each of said image blocks comprises a white background block, being performed in parallel processing that individually evaluates all of said image blocks simultaneously.

15. The method according to claim 13, said determining said squared error for each pixel comprising multiplying said difference between a pixel value and said block average by itself.

16. The method according to claim 13, said dividing said image into image blocks comprising assigning rectangular geometric regions to said image.

17. The method according to claim 13, further comprising filtering all colors except gray from said image before performing said dividing said image into image blocks.

18. The method according to claim 13, said pixel value comprising a darkness measure for each said pixel.

19. An image processing device comprising:

an input and output device receiving an image; and a processor operatively connected to said input and output device, said processor:

automatically dividing said image into image blocks, automatically determining a block average by determining an average pixel value for each of said image blocks, automatically determining a squared error for each pixel within each of said image blocks by calculating a squared difference between a pixel value and said block average for each said pixel in each of said image blocks, automatically determining a sum of squared errors value for each of said image blocks, automatically removing ones of said image blocks determined to a white background block to produce valid image blocks of said image, automatically determining a number of high-variation blocks within said valid image blocks by counting ones of said valid image blocks that have said sum of squared errors value exceeding a block variation threshold, automatically determining a page variance measure by dividing said number of high-variation blocks by a total number of said valid image blocks, automatically classifying said image as comprising a halftone and text image based on said page variance measure exceeding a halftone threshold, automatically determining a text index by counting a number of said valid image blocks that have said sum of squared errors value exceeding a text threshold, automatically classifying said image as comprising a continuous tone image based on said page variance measure not exceeding said halftone threshold and said text index being below a text index threshold, automatically classifying said image as comprising a continuous tone and text image based on said page variance measure not exceeding said halftone threshold and said text index not being below said text index threshold, and automatically selecting an image processing mode based on said image being one of said halftone and text image, said continuous tone and text image, and said continuous tone image.

20. The image processing device according to claim 19, said determining said block average, said determining said squared error, said determining said sum of squared errors, and said determining whether each of said image blocks comprises a white background block, being performed in parallel processing that individually evaluates all of said image blocks simultaneously.

21. The image processing device according to claim 19, said determining said squared error for each pixel comprising multiplying said difference between a pixel value and said block average by itself.

22. The image processing device according to claim 19, said dividing said image into image blocks comprising assigning rectangular geometric regions to said image.

23. The image processing device according to claim 19, said processor filtering all colors except gray from said image before performing said dividing said image into image blocks.

* * * * *

UNITED STATES PATENT AND TRADEMARK OFFICE
CERTIFICATE OF CORRECTION

| | | |
|---|---|---|
| PATENT NO. | : 9,055,251 B2 | Page 1 of 1 |
| APPLICATION NO. | : 14/034690 | |
| DATED | : June 9, 2015 | |
| INVENTOR(S) | : Dhevendra Alagan Palanivel et al. | |

It is certified that error appears in the above-identified patent and that said Letters Patent is hereby corrected as shown below:

In the drawings,

Sheet 2, Fig. 2, reference numeral 204 should read --MFD--.

Signed and Sealed this
Twenty-ninth Day of September, 2015

Michelle K. Lee
*Director of the United States Patent and Trademark Office*